US009007450B2

(12) United States Patent
Amling et al.

(10) Patent No.: US 9,007,450 B2
(45) Date of Patent: *Apr. 14, 2015

(54) VIDEO IMAGING SYSTEM WITH DETACHABLE STORAGE DEVICE

(75) Inventors: Marc R. Amling, Santa Barbara, CA (US); Daniel Lietz, Santa Barbara, CA (US); Marios Kyperountas, Santa Barbara, CA (US)

(73) Assignee: Karl Storz Imaging, Inc., Goleta, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/408,635

(22) Filed: Feb. 29, 2012

(65) Prior Publication Data
US 2012/0162472 A1    Jun. 28, 2012

Related U.S. Application Data

(63) Continuation of application No. 12/267,302, filed on Nov. 7, 2008, now Pat. No. 8,199,188, which is a continuation-in-part of application No. 10/034,273, filed on Dec. 28, 2001, now Pat. No. 8,274,559, which is a continuation-in-part of application No. 10/039,931, filed on Nov. 9, 2001, now Pat. No. 7,212,227.

(51) Int. Cl.
*H04N 5/76* (2006.01)
*A61B 1/04* (2006.01)
(Continued)

(52) U.S. Cl.
CPC ........... *H04N 5/232* (2013.01); *H04N 5/77* (2013.01); *H04N 5/765* (2013.01); *H04N 5/775* (2013.01); *H04N 5/781* (2013.01); *H04N 5/907* (2013.01); *H04N 2005/2255* (2013.01)

(58) Field of Classification Search
USPC .............. 348/72–76, 207.99, 207.1, 211.4, 348/211.6, 211.9, 231.99, 231.7–231.9
See application file for complete search history.

(56) References Cited

U.S. PATENT DOCUMENTS

| 4,816,909 A | 3/1989 | Kimura et al. |
| 5,584,292 A | 12/1996 | Cheung |

(Continued)

FOREIGN PATENT DOCUMENTS

| EP | 0994614 A2 | 4/2000 |
| EP | 1311117 A2 | 5/2003 |

(Continued)

OTHER PUBLICATIONS

Anonymous: "Datacube introduces world•s highest performance CameraLink frame grabber" Internet Article, •Online! Oct. 30, 2001, XP002362612 Retrieved from the Internet: URL:www.datacube.com/downloads/MaxRevProdIntro.htm •retrieved on Jan. 12, 2006! *the whole document*.

(Continued)

*Primary Examiner* — Timothy J Henn
(74) *Attorney, Agent, or Firm* — St. Onge Steward Johnston & Reens LLC (57) ABSTRACT

A video imaging system that allows a user to save select image data to at least one detachable storage device, the image data presented on a display for the user, where the user is provided with various control interfaces for saving and appending information to the saved image data. The at least one detachable storage device also including user settings data that is used to adjust the settings of the camera control unit according to the user preferences.

35 Claims, 6 Drawing Sheets

(51) Int. Cl.
*H04N 5/232* (2006.01)
*H04N 5/77* (2006.01)
*H04N 5/765* (2006.01)
*H04N 5/775* (2006.01)
*H04N 5/781* (2006.01)
*H04N 5/907* (2006.01)
*H04N 5/225* (2006.01)

(56) References Cited

U.S. PATENT DOCUMENTS

| | | |
|---|---|---|
| 5,604,530 A | 2/1997 | Saito et al. |
| 5,627,583 A | 5/1997 | Nakamura et al. |
| 5,754,422 A | 5/1998 | Lowles et al. |
| 5,812,188 A | 9/1998 | Adair |
| 5,868,666 A | 2/1999 | Okada et al. |
| 5,871,439 A | 2/1999 | Takahashi et al. |
| 5,896,166 A | 4/1999 | D'Alfonso et al. |
| 6,184,922 B1 | 2/2001 | Saito et al. |
| 6,215,517 B1 | 4/2001 | Takahashi et al. |
| 6,224,542 B1 | 5/2001 | Chang et al. |
| 6,249,311 B1 | 6/2001 | Rouse, Jr. et al. |
| 6,295,082 B1 | 9/2001 | Dowdy et al. |
| 6,313,868 B1 | 11/2001 | D'Alfonso et al. |
| 6,360,362 B1 | 3/2002 | Fichtner et al. |
| 6,452,629 B1 | 9/2002 | Aizawa et al. |
| 6,638,212 B1 | 10/2003 | Oshima |
| 6,707,490 B1 | 3/2004 | Kido et al. |
| 6,710,799 B2 | 3/2004 | Abnet et al. |
| 6,750,902 B1 | 6/2004 | Steinberg et al. |
| 7,212,227 B2 | 5/2007 | Amling et |
| 2001/0051762 A1 | 12/2001 | Murata et al. |
| 2002/0095501 A1 | 7/2002 | Chiloyan et al. |
| 2003/0076410 A1 | 4/2003 | Beutter et al. |
| 2003/0081950 A1* | 5/2003 | Gennetten et al. ............ 396/297 |
| 2003/0220947 A1 | 11/2003 | Doui |
| 2004/0028390 A9 | 2/2004 | Chatenever et al. |
| 2004/0141054 A1 | 7/2004 | Mochida et al. |
| 2004/0201743 A1 | 10/2004 | Amling et al. |
| 2004/0218065 A1 | 11/2004 | Schinner |
| 2004/0225185 A1 | 11/2004 | Obata et al. |
| 2005/0177669 A1 | 8/2005 | Peters et al. |
| 2005/0228293 A1 | 10/2005 | Cahill et al. |
| 2005/0278461 A1 | 12/2005 | Ohta |
| 2006/0034600 A1* | 2/2006 | Wang ............................ 396/153 |
| 2006/0055793 A1 | 3/2006 | Adler et al. |
| 2006/0092312 A1 | 5/2006 | Tanaka |
| 2007/0124459 A1 | 5/2007 | Kasama |
| 2008/0091065 A1 | 4/2008 | Oshima et al. |
| 2008/0117442 A1 | 5/2008 | Kosaka et al. |
| 2008/0218959 A1 | 9/2008 | Wu et al. |
| 2009/0080562 A1 | 3/2009 | Franson |
| 2009/0231684 A1 | 9/2009 | Gonthier et al. |
| 2011/0169987 A1* | 7/2011 | Gann ............................ 348/246 |

FOREIGN PATENT DOCUMENTS

| | | |
|---|---|---|
| EP | 1679030 A1 | 7/2006 |
| EP | 1739579 A1 | 1/2007 |
| EP | 1909490 A2 | 4/2008 |
| JP | 63153039 A | 6/1988 |
| JP | 5277065 A | 10/1993 |
| JP | 6285017 A | 10/1994 |
| JP | 11047089 A | 2/1999 |
| JP | 11298907 A | 10/1999 |
| JP | 2000165960 A | 6/2000 |
| JP | 2000175089 A | 6/2000 |
| JP | 2000325293 A | 11/2000 |
| JP | 2001099627 A | 4/2001 |
| JP | 2001157200 A | 6/2001 |
| JP | 2001350104 A | 12/2001 |
| JP | 2002326679 A | 11/2002 |
| JP | 2003288211 A | 10/2003 |
| JP | 2004007368 A | 1/2004 |
| JP | 2004191911 A | 7/2004 |
| JP | 2005519719 A | 7/2005 |
| JP | 2006128968 A | 5/2006 |
| JP | 2006243997 A | 9/2006 |
| JP | 2006334247 A | 12/2006 |
| JP | 2007013574 A | 1/2007 |
| JP | 2007028188 A | 2/2007 |
| WO | 03099111 A1 | 12/2003 |

OTHER PUBLICATIONS

Anonymous: "MaxRevolution datasheet" Internet Article, •Online! pp. 1-2, Retrieved from the Internet: URL:http://www.datacube.com/downloads/Datasheet_MaxRevolution.pdf • retrieved on Jan. 12, 2006 * the whole document*.

Definition of "software", The IEEE Standard Dictionary of Electrical and Electronics Terms, Sixth Edition, 1996, p. 1006. European Search Report; Jan. 20, 2006; 3 pages.

Description of "software", The IEEE Standard Dictionary of Electrical and Electronics Terms, Sixth Edition, 1996, p. 1006.

European Search Report; EP 09 17 5038; Jan. 25, 2010; 9 pages.

European Search Report; Jan. 23, 2006; 4 pages.

European Search Report, EP07019564, Sep. 8, 2008, 2 Pages.

Laurence J. Thorpe, et al.; "The All-Digital Camcorder—The Arrival of Electronic Cinematography"; SMPTE Journal, vol. 105, No. 1; Jan. 1, 1996; pp. 13-30.

* cited by examiner

FIG. 6

VIDEO IMAGING SYSTEM WITH DETACHABLE STORAGE DEVICE

CROSS REFERENCE TO RELATED APPLICATION

The present application is a continuation of pending of U.S. patent application Ser. No. 12/267,302, filed on Nov. 7, 2008, which in turn is a continuation-in-part of pending U.S. patent application Ser. No. 10/034,273, filed on Dec. 28, 2001, which is a continuation-in-part of U.S. patent application Ser. No. 10/039,931, filed on Nov. 9, 2001, now U.S. Pat. No. 7,212,227, issued on May 1, 2007. The content of all prior applications is incorporated herein by reference.

FIELD OF THE INVENTION

The invention relates to a camera control unit capable of processing a video signal from many different types of video cameras and, more particularly, the invention relates to an integrated camera control system that can save images to numerous types of storage devices.

BACKGROUND OF THE INVENTION

A camera and a camera control unit (CCU) are generally used in conjunction with each other to capture and process images, whether still frames or video clips. The camera typically includes a charge couple device (CCD) for receiving reflected light and generating an image signal, which is sent to the control unit. The image signal may be sent to the control unit via a hardwired cable or via a wireless connection. Upon receiving the image signal, the CCU processes it into image data, which may comprise one of many different formats. The CCU is also used to send commands to the camera.

It is known to provide a CCU that is capable of coupling to a number of different cameras, where each camera may have different camera settings and image signal formats. The CCU is able to detect the type of camera attached and adjust itself to function properly with the camera that is currently attached. Once the CCU determines the type of camera attached to it, the CCU will then look to receive camera settings data, either from the camera or from another location. Once the CCU adjusts to the particular camera, the CCU may then correctly process the image data sent from the camera.

However, while certain cameras may require particular settings to function properly, exact settings are typically not required. In fact, users, such as a surgeon, may often slightly or even significantly, adjust the settings of the camera to their personal optimum desired settings. This can be quite time consuming for the user, especially when the user is performing multiple procedures during the day and must readjust the settings every time new equipment is used from operating room to operating room.

Typically, the CCU is coupled to a display, located adjacent to the operator, such that the formatted image signal is presented on the display so that the operator can view it. Some systems have also provided for saving of image signals on the CCU for later retrieval. However, a limitation of existing systems is that they are generally limited to function with equipment that is currently in use and are not provided to seamlessly integrate with newer equipment. The difference between older and newer equipment may contribute toward compatibility problems between the CCU and the new equipment.

It is also known to provide control of medical equipment via various control interfaces that may be located in the sterile environment. For example, an image may be presented to the user on a display while the user may enter commands via a keyboard or the like. However, current systems do not allow the user to do is manipulate the image(s)/video presented to the user on the display. It may be highly desirable, for example, to save certain portions of a video clip or certain image frames to a particular save location for easy access by the user. It may also be advantageous to manipulate the video clip or certain image frames, for example, to crop, zoom, or add a highlighting box to a particular location, etc., prior to saving the image to a particular location.

SUMMARY OF THE INVENTION

Accordingly, what is desired then is a system and method that allows for image data to be saved to a selected location that may be easily accessible to the user.

It is also desired to provide a system and method that provides an output interface that will be compatible with future devices and technology.

It is further desired to provide a system and method that allows a user to quickly and easily update system settings based on the user's personal preferences.

It is still further desired to provide a system and method that allows the user to manipulate image data that is saved to a selected location.

These and other objects are achieved, in one embodiment, by the provision of a CCU that incorporates a USB port for porting/saving of images data that is selected by the user. For example, selected image data, whether a video clip(s) or a still frame(s), may be sent to the USB port. The user may provide storage device that will provide easy accessibility to the data, such as, for example, but not limited to, a USB flash/thumb device or a USB external hard drive. In this manner, the physician can simply unplug the USB device from the CCU and take the selected image data with them for review and analysis. This can be very helpful for the user, who may not have a network connection to the hospital system and does not want to wait for the data to finally be made available.

Alternatively, it is conceived that a network device may be plugged into the USB port such that the user may directly download the selected images from the hospital system to which the user's computer is connected to.

Still further, as technology changes and new equipment becomes available, the USB port will provide for a universal data coupling that will be compatible with future technologies as it uses an industry standard data format that can be used by new equipment.

In another embodiment, the CCU is provided with another USB port (or it may be the same USB port discussed above), in which the user (physician) may insert a USB flash/thumb device or a USB external hard drive that includes the user's personal setting preferences. For example, when the camera is coupled to the CCU, the CCU will detect the type of camera coupled to it, retrieve the particular settings (e.g. camera's optical characteristics, such as focal distance, resolution, light balance, or color), and adjust its settings accordingly. However, the user (physician) may have a personal preference for settings that differ from the default settings. Accordingly, the user may have their particular preferences saved to a USB flash/thumb device that the user merely has to insert into the USB port. The CCU may then either automatically upload the users preference settings, or the user can instruct the CCU to upload the users preference settings. This will save the user the time of having to adjust settings, which can be significant if the user is performing multiple procedures throughout the day.

The CCU may, in one embodiment, be provided with software executing on the CCU for determining when the camera is coupled to the CCU. Likewise, software may be provided on the CCU for determining when the USB flash/thumb device is coupled to the USB port. The information retrieved from the USB flash/thumb device may comprise data setting, a program(s), or instructions relating to where to retrieve any of the aforementioned information. The retrieved data and/or program(s) execute on the CCU for setting the users preference settings.

It is contemplated that the CCU may comprise, for example, a Field Programmable Gate Array (FPGA) (e.g. a configurable hardware device) or a Digital Signal Processor (DSP) (e.g. a soft configurable device) that may be programmed depending upon the USB flash/thumb device attached thereto.

The system may further be provided such that the user can manipulate the video clip(s) and/or still frame(s) that are saved to the particular storage location. For example, the user may be presented with a video feed of a surgical area in which an endoscope if positioned. The video is presented to the user on a display. The user may then decide that either a portion of video should be recorded or that a still frame(s) can be taken of the area. If the user decides, for example, to take a still frame picture, the picture may be presented to the user on the display. The user can save the still frame as desired and described above. In addition, it is contemplated that the user may desire to manipulate the still frame in some manner, including, for example, cropping the still frame, enlarging a particular area of the still frame, or providing a box or the like around a particular portion of the image to highlight a portion of the surgical area. It is further contemplated that this functionality can be done either before or after the image is saved. In any event, it provides the user with increased functionality with regard to saving and/or manipulating the still frame or video clip. It is still further contemplated that the user can add or append written text or audio commentary to the still frame or video clip as desired.

While the device has been described using a display and keyboard, it is still further contemplated that the video system may use an integrated touch screen controlling system for presentation of image data, control of the imaging device(s), manipulation of the image data and saving of the image data as desired.

For this application the following terms and definitions shall apply:

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The term "surgical suite" as used herein means an integrated surgical system that includes one or more controllers; a bus; one or more medical devices (e.g. cutting/cauterizing tool(s), irrigation tool(s), aspiration tool(s), visualization tool (s), recording and/or printing devices, etc.); where the various devices are coupled to the bus and controlled by an interface device.

In one advantageous embodiment a video imaging system is provided comprising a camera for generating image data, said camera including a camera storage having camera data for identifying the camera. The system further comprises a camera control unit coupled to the camera and receiving the camera data, the camera control unit adjusting internal settings based on received camera information such that the camera control unit receives and processes the image data. The system also comprises an interface port located in the camera control unit and a detachable storage device coupled to the interface port receiving selected image data that is stored thereon. The system is provided such that the interface port is selected from the group consisting of: a USB port, a Firewire port, a serial ATA port and combinations thereof.

In another advantageous embodiment a method for storing image data is provided comprising the steps of storing camera data on a camera, coupling the camera to a camera control unit and transmitting the camera data to the camera control unit. The camera control unit further receives camera information. The method also comprises the steps of configuring the camera control unit based on the received camera information, generating image data with the camera and transmitting the image data to the camera control unit. Finally, the method comprises the steps of coupling a detachable storage device to an interface port located in the camera control unit and saving select image data on the detachable storage device. The method is provided such that the interface port is selected from the group consisting of: a USB port, a Firewire port, a serial ATA port and combinations thereof.

Other objects of the invention and its particular features and advantages will become more apparent from consideration of the following drawings and accompanying detailed description.

DETAILED DESCRIPTION OF THE INVENTION

Referring now to the drawings, wherein like reference numerals designate corresponding structure throughout the views.

Figure 1:
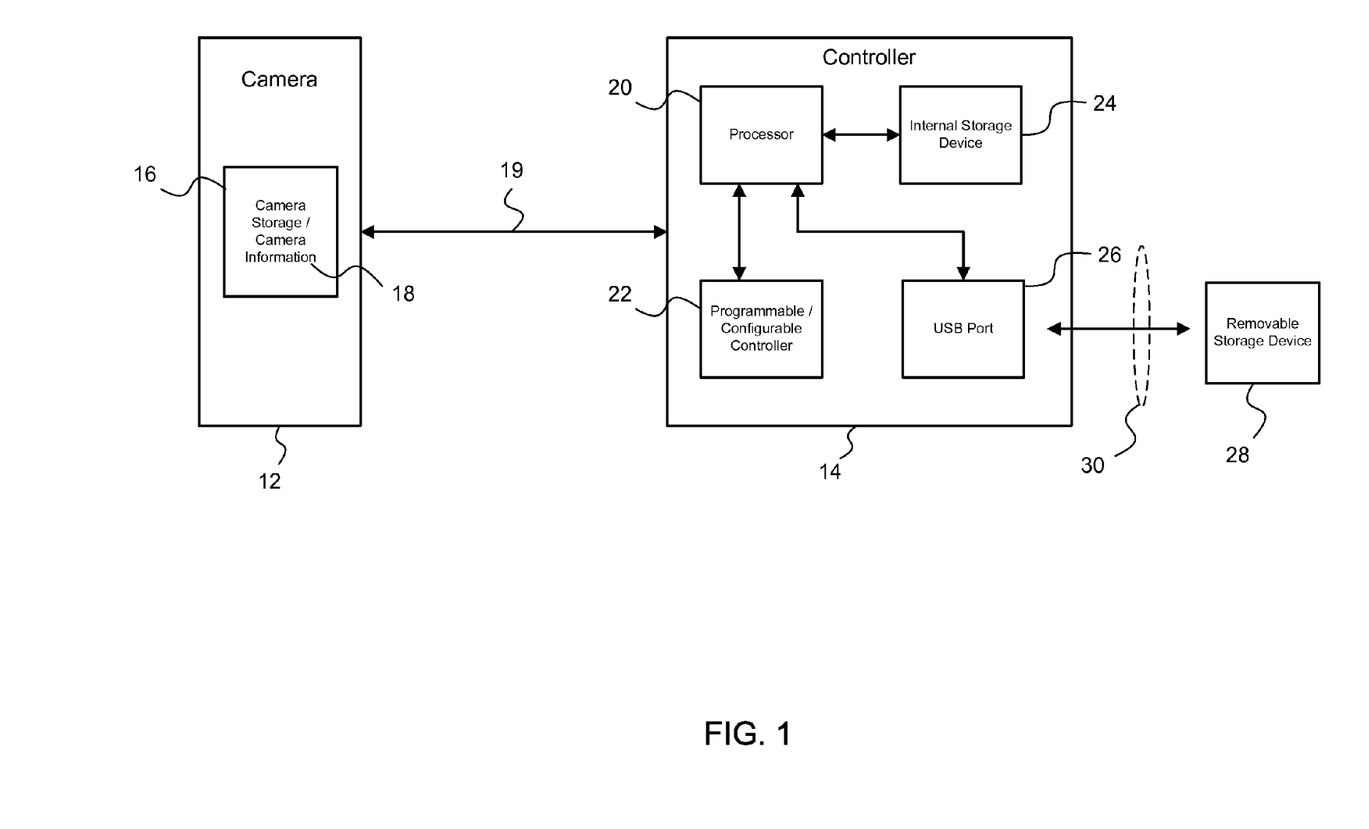
FIG. 1 is a block diagram of one advantageous embodiment of the present invention.

FIG. 1 is a block diagram illustrating video system 10, which generally includes a camera 12 and a camera control unit (CCU) 14. The camera may include virtually any type of camera that may be used to generate video and/or still frame images. In one embodiment, the camera 12 may be attached to an endoscope for use in a surgical procedure. The camera 12 is coupled to CCU 14 at camera coupling 19 as indicated by the arrow connected between camera 12 and CCU 14 in FIG. 1. It is contemplated that the coupling may comprise either a hard-wired or a wireless coupling. Additionally, the coupling may comprise either an electrical, an optical or a combined electro-optic coupling. For example, the endoscope may be provided with a light source. Alternatively, a light source may be located in the CCU 14 such that the illuminating light is provided to camera 12 via the coupling attachment between camera 12 and CCU 14 or the endoscopic camera head may contain the light source.

It is contemplated that a camera storage 16 is located on camera 12. The camera storage 16 may comprise any type of storage device for storing camera data thereon. For example, camera storage 16 may comprise RAM, ROM, may be permanently located in camera 12 or may comprise a detachable storage device. Camera information 18 is saved on camera storage 16. Camera information 18 may comprise factory settings for camera 12. In this manner, upon connection of camera 12 to CCU 14, camera information 16 is transmitted to CCU 14 that identifies the type of camera and provides the correct settings for CCU 14 to receive and process information received from the particular camera attached. The CCU 14 is therefore self-configurable to automatically detect the type of camera attached to it. CCU 14 is provided with a processor 20 that receives the camera information 16 and a programmable/configurable controller 22 that is programmed/configured based on the received camera information 16. It should further be noted that camera information may comprise a software program(s) or may comprise data that is used by a program resident on and executing on processor 20. Alternatively, camera information may comprise a first program that is transmitted from camera 12 to CCU 14 for configuring the processor 20 and a second program that runs on programmable/configurable controller 22.

Also depicted in FIG. 1 is internal storage device 24, which may comprise any type of data storage device. As stated above, various data and/or software programs may be saved on internal storage device 24 for the operation of CCU 14.

Interface port 26 is further illustrated on CCU 14. The interface port 26 may comprise a USB port, a firewire port, or a serial ATA port. Port 26 is provided, in one advantageous embodiment, to receive a standard USB connector. In one embodiment, USB port receives detachable storage device 28 that may comprise, a USB flash/thumb device or a USB external hard drive. It is contemplated that the detachable storage device 28 may be set to receive selected image data transmitted from camera 12 to CCU 14. In still another embodiment, it is contemplated that interface port 26 may comprise a wireless coupling to a detachable storage device 28.

Once the CCU 14 is properly programmed/configured to properly process the image data generated by the camera 12 and transmitted to CCU 14, CCU 14 may be programmed to direct selected image data to the detachable storage device 28. For example, a user (physician) may be performing a procedure. It may be advantageous to record a video clip of a portion of the procedure. Alternatively, it may be desired to save one or more still frame images of the procedure for the physician to refer to at a later time. The physician may, select certain portions of the procedure to save (e.g. in video and/or still frame format) to detachable storage device 28. In this manner, the physician can quickly and easily obtain the information on the procedure for immediate review and analysis whether right there in the operating room, immediately after the procedure at the hospital, or even on the physicians computer at their office or home as it is saved to the physicians detachable storage device 28. This is highly advantageous as the physician does not have to wait for the images to be processed on the hospital system in order to access the information, saving time for the doctor.

In yet another embodiment, it is contemplated that a network connection 30 may be coupled to USB port 26 such that the selected information may be transmitted to a storage device via the network. Additionally, the CCU 14 may be coupled to a surgical suite and provided to control various pieces of equipment, such as, via for example, but not limited to, a touch screen controller or the like.

Figure 2:
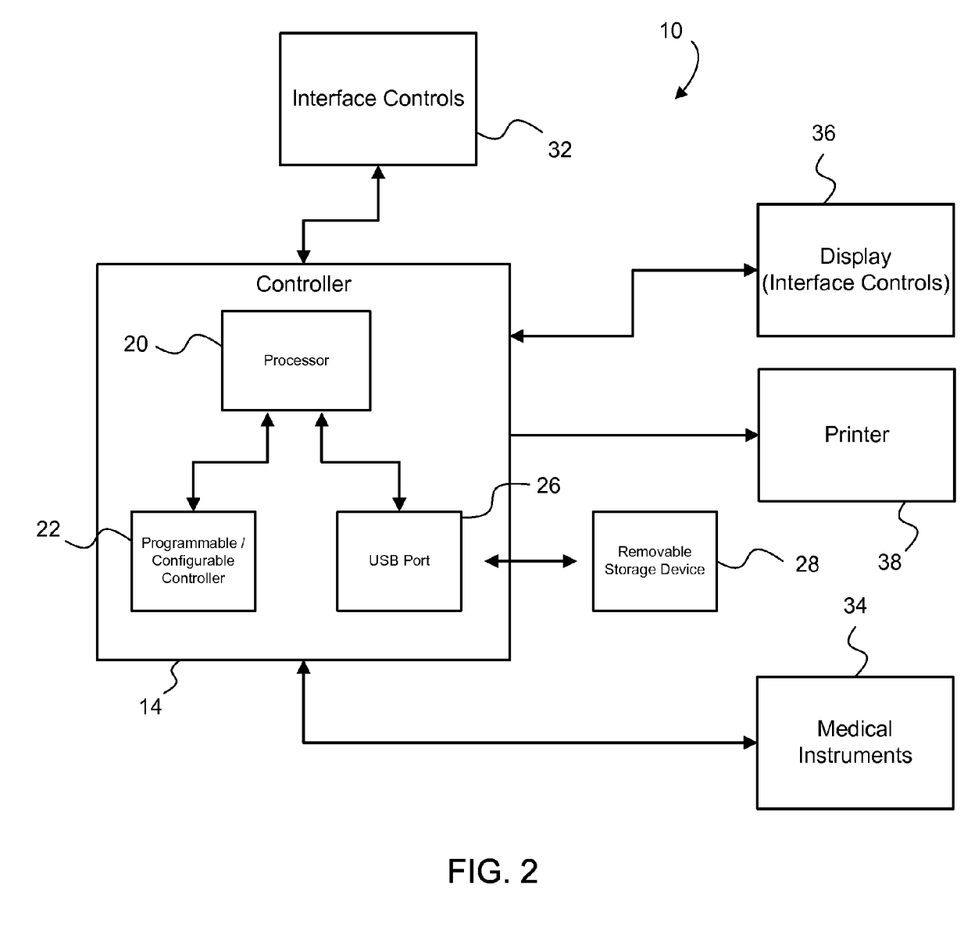
FIG. 2 is a block diagram of an embodiment according to FIG. 1.

Referring now to FIG. 2, the CCU 14 is depicted including a number of peripheral devices. For example, interface controls 32 are illustrated coupled to CCU 14. Interface controls 32 may comprise, for example but are not limited to a keyboard, mouse, track device, touch screen, or similar interface that allows a user to enter commands into the system 10. In a rack mounted embodiment, a keyboard (or other input device) may be mounted so as to allow the interface device to be positioned for the comfort of the user. It is contemplated that virtually any type of input control device may effectively be used to control various medical instruments 34 that may be used by the physician, including, suction devices, cutting devices, cauterizing devices and the like. Such devices may effectively be controlled by the various interface controls 32 by the physician in the sterile environment or by an individual (e.g. a nurse) outside the sterile environment.

Also depicted in FIG. 2 is display 36 for displaying the image data to the physician. Display 36 may comprise virtually any type of display, such as, for example, a flat panel display providing DVI 480P and 720P progressive image capabilities (4:3 and 16:9 aspect ratio). Still resolutions may comprise, for example, 640×480, 800×600, 1024×768 and so on in various formats such as, JPEG, BMP, TIFF and other formats. It should be noted that virtually any resolution may be selected as well as virtually any type of file format may be selected for the saving of image data.

It is still further contemplated that the display 36 may, on another embodiment, comprise a touch screen controller where some or all of interface controls may be accessible. For example, image data may be provided on display 36 as well as various controls for controlling the connected surgical equipment.

Printer 38 is still further illustrated connected to CCU 14. Printer 38 may comprise virtually any type of printer (e.g. color printer) for printing out still frames corresponding to the image data sent to the CCU 14. The printer could be locally positioned in the operating room, it could be rack mounted, or could be coupled to the system 10 via a network connection at a remote location. It is further contemplated that printer 38 may comprise one or more printers as desired.

Referring back to detachable storage device 28, it is contemplated that not only can select image data be stored thereon, but user settings data may be saved on the detachable storage device 28. While the system 10 is designed to automatically identify the type of camera 12 coupled to CCU 14 and correspondingly adjust CCU 14 according to the identified camera, the physician may have personal preferences for the operation of camera 12 that differ from the default (factory) settings. In this event, the user can set their personal preferences and save these to the detachable storage device 28. Upon coupling the detachable storage device to USB port 26, processor 20 can detect and upload the information and adjust the settings to correspond to the physician's personal preferences. This can be done automatically, or the user may instruct the system 10 to update system configuration according to the personal preferences saved on the detachable storage device 28. In any event, this will save the user the time of having to adjust settings, which can be significant if the user is performing multiple procedures throughout the day on different systems in different operating rooms. The saving of select image data and the sending of user settings data from detachable storage device 28 is further illustrated in FIG. 4.

Figure 4:
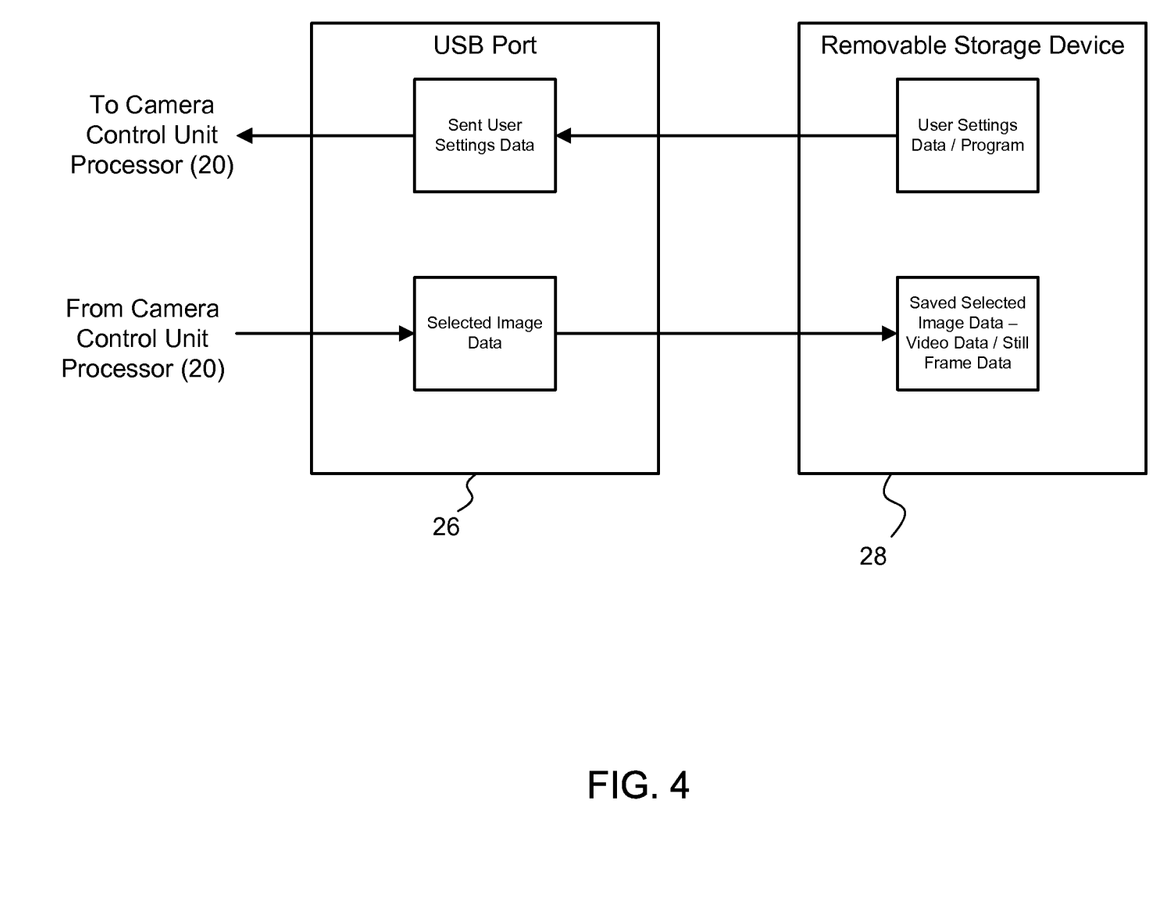
FIG. 4 is a block diagram of the USB connection according to FIG. 2.

It is contemplated that the user settings data may comprise data system 10 may use to properly set programmable/configurable controller 22, or may comprise a software program (s) that is uploaded onto CCU 14 for executing on the processor 20 and/or programmable/configurable controller 22. For example, in one embodiment it is contemplated that a first program is uploaded to processor 20 for programming the processor, and a second program is uploaded and executed by the processor 20 for proper programming of the programmable/configurable controller 22.

Figure 3:
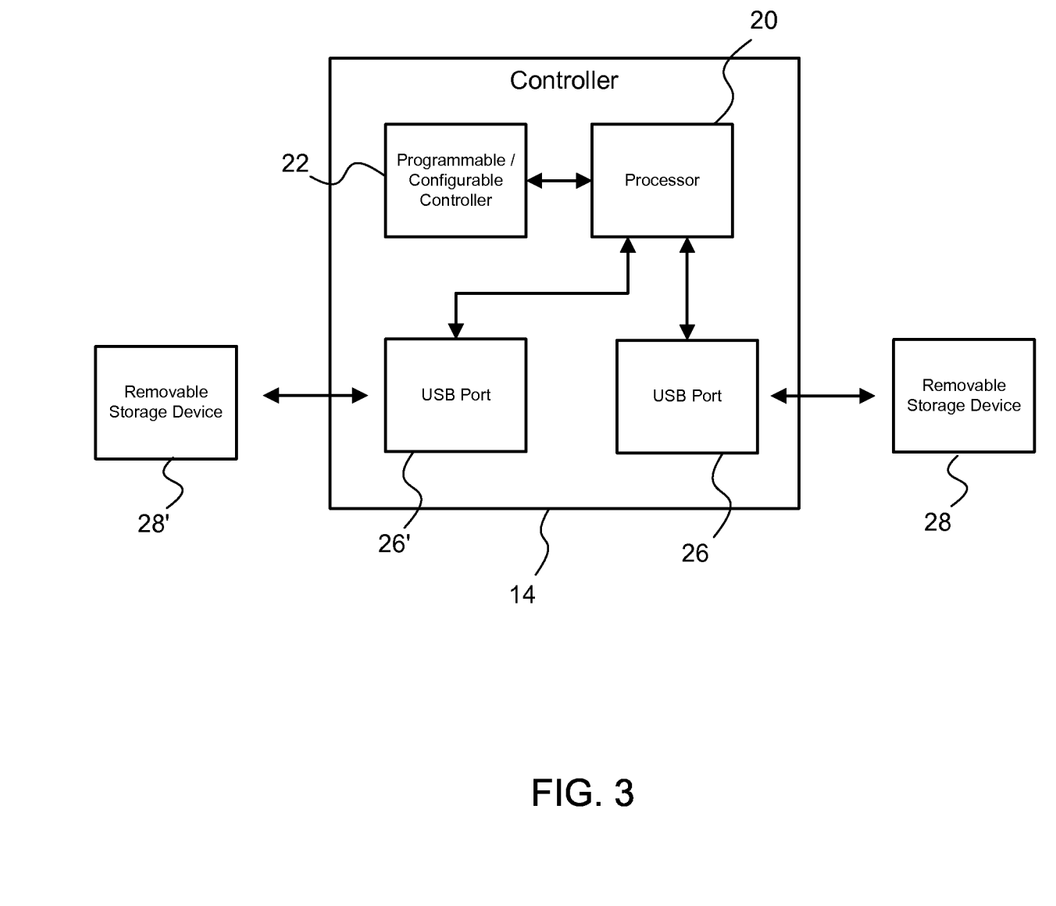
FIG. 3 is a block diagram of another embodiment according to FIG. 1.
Figure 5:
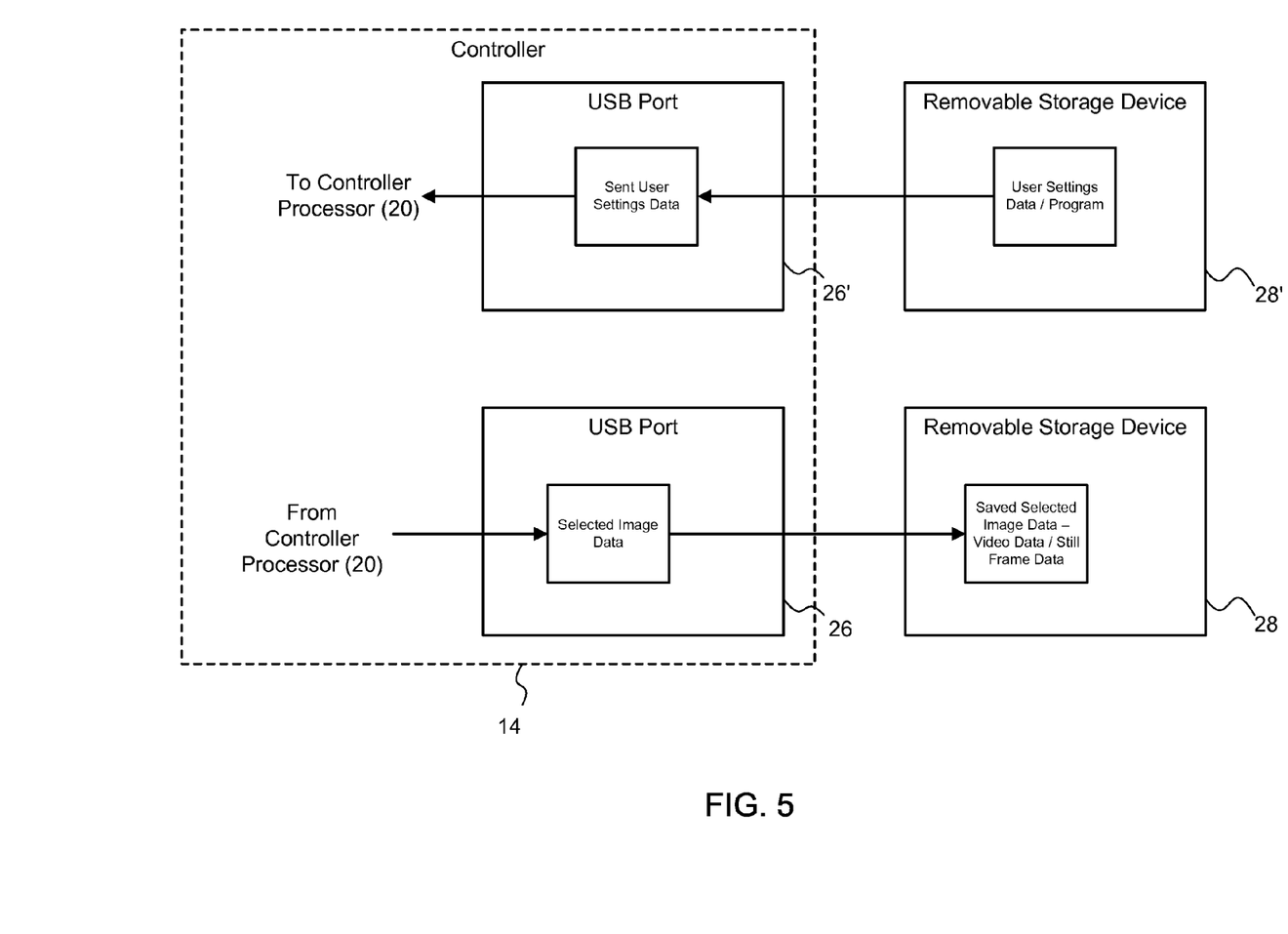
FIG. 5 is a block diagram of the USB connection according to FIG. 3.

Referring now to FIGS. 3 and 5, an alternative embodiment is provided. In this embodiment, rather than having a single USB port 26 provided in CCU 14, two USB ports (26, 26') are provided for receiving two different detachable storage devices (28, 28'). For example, detachable storage device 28 may be inserted into USB port 26 for receiving select image data to be stored thereon. Whereas detachable storage device 28' may be inserted into USB port 26' for uploading of user settings data to CCU 14 for proper configuration of programmable/configurable controller 22.

While two different USB ports are illustrated in FIGS. 3 and 5 for receiving various detachable storage devices, it is contemplated that any number of ports may be used a desired to couple various settings data for the attached medical devices.

Referring back to FIG. 2, it is still further contemplated that the image data presented to the user on display 36 may be manipulated by the user on screen. For example, the user may desire to zoom in on a particular area in a still frame, or may want to crop the frame. Additionally, the user may want to append information (audio, visual or link data) to a video clip or a still frame for later reference and retrieval. For example, the physician may desire to save comments to the image data, which may be done via an input device that the user may speak into for recording and linking to the saved file. Alternatively, the various information may be linked to the file including, the time and date of the image/video clip, the physician doing the procedure, the location of the procedure, the equipment used, etc. Still further, the physician may desire to write directly on the still frame or attach written comments to the video/still frame file. In any event, this provides the physician with many differing options for dealing with the image data that is to be saved to the detachable storage device 28. It will be appreciated that the physician may, for example, provide annotation either during or after the image data is recorded, including the appending of virtually any type of information such as, a visual annotation to the image data, an audio stream associated with the image data, or an alpha-numeric notation, and the like.

Figure 6:
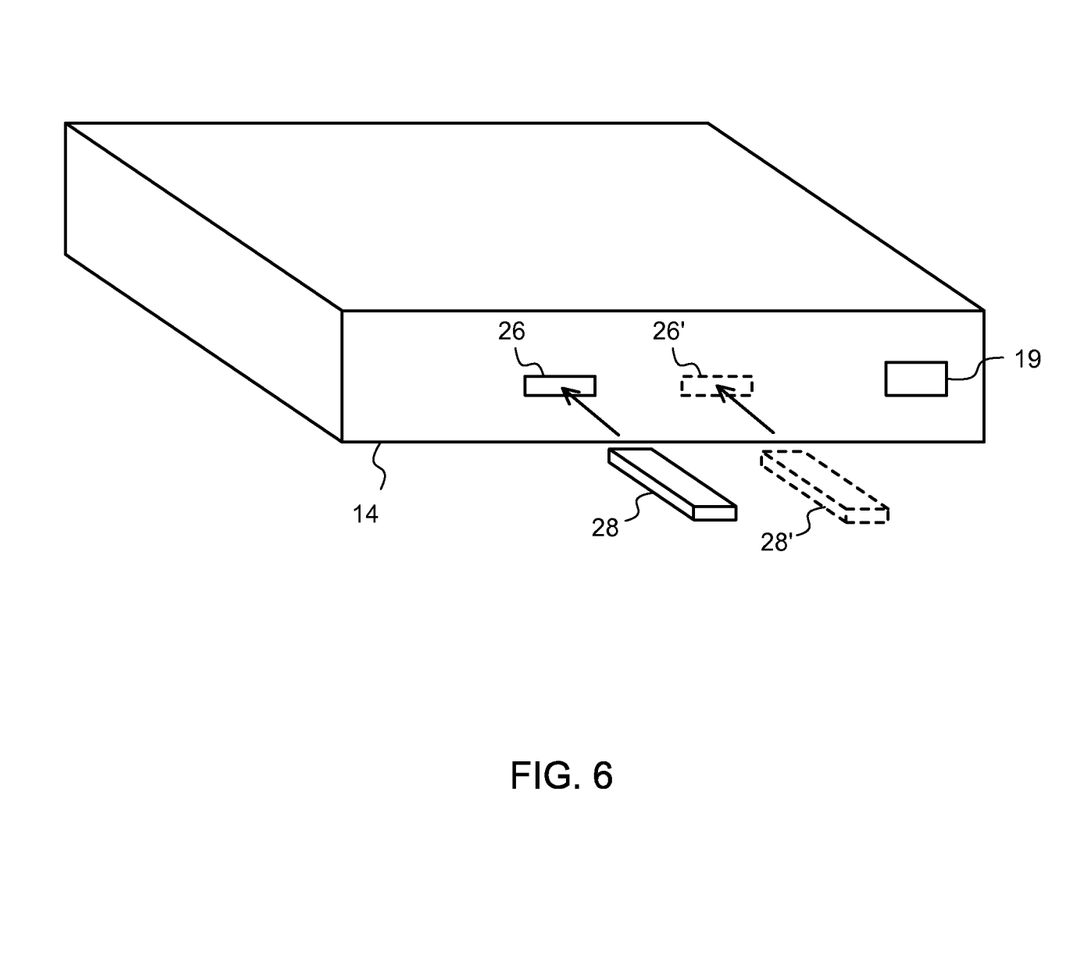
FIG. 6 is a perspective diagram of the system according to FIG. 1.

FIG. 6 is a perspective drawing of CCU 14 illustrating, for example, USB port 26 positioned on a front panel of CCU 14 along with USB port 26' (shown in dashed lines) and camera coupling 19 where camera 12 is plugged into CCU 14. Alternatively, USB ports 26 and 26' may be positioned anywhere on CCU 14, including, for example, on a rear panel of CCU 14.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A video imaging system, comprising:
   an endoscopic camera for generating image data, said camera including a camera storage having camera data for identifying the camera;
   a camera control unit coupled to said camera and receiving the camera data, said camera control unit adjusting internal settings based on received camera data such that the camera control unit receives and processes the image data;
   at least one interface control, including an input device, receiving a user selection of at least a portion of the image data, said at least one interface control further receiving commands to control one or more medical devices;
   at least one interface port located in said camera control unit;
   at least one detachable storage device coupled to said at least one interface port receiving the selected image data that is stored thereon;
   wherein said at least one detachable storage device includes user settings data comprising a software program that executes on said camera control unit such that the camera control unit is further adjusted based on the user settings data stored on said at least one detachable storage device.

2. The video imaging system according to claim 1, wherein said at least one interface port includes a first interface port and a second interface port and said at least one detachable storage device includes a first detachable storage device coupled to the first interface port and a second detachable storage device coupled to the second interface port,
   wherein said second detachable storage device includes the user settings data.

3. The video imaging system according to claim 1, said detachable storage device is one of a USB flash/thumb device and a USB external hard drive.

4. The video imaging system according to claim 1, wherein upon connection of the at least one detachable storage device, said camera control unit automatically uploads the user settings data and adjusts the camera control unit.

5. The video imaging system according to claim 1, further comprising a display coupled to the camera control unit such that the image data is presented to a user on said display.

6. The video imaging system according to claim 5, wherein said display comprises said at least one interface control, wherein said at least one interface control is a touch screen.

7. The video imaging system according to claim 5, wherein the image data presented on the display is saved to said detachable storage device, wherein the selected image data is selected from the group consisting of video data, still frame data and combinations thereof.

8. The video imaging system according to claim 7, wherein when still frame data is saved to said detachable storage device, the resolution of the still frame data is selectable from a plurality of selectable resolutions.

9. The video imaging system according to claim 7, wherein when still frame data is saved to said detachable storage device, the still frame data is savable in a variety of formats selected from the group consisting of JPG format, BMP format, and TIFF format.

10. The video imaging system according to claim 1, wherein said at least one interface control further receives alterations of the selected image data from the user.

11. The video imaging system according to claim 10, wherein the alterations of the selected image data comprises at least one of cropping, zooming, and highlighting.

12. The video imaging system according to claim 11, wherein the alterations of the selected image data further comprises appending data, wherein the appending of data comprises at least one of visual data, audio data, alpha-numeric data, and linked data.

13. The video imaging system according to claim 1, wherein said detachable storage device comprises a network connection to a remote storage device.

14. A method for storing image data, comprising the steps of:
storing camera data on an endoscopic camera, the camera data identifying the camera;
coupling the camera to a camera control unit;
transmitting the camera data to the camera control unit;
the camera control unit receiving the camera data;
configuring the camera control unit based on the received camera data;
coupling at least one detachable storage device to an interface port located in the camera control unit;
transferring user settings data, comprising a software program that executes on said camera control unit, from the at least one detachable storage device and adjusting the camera control unit based on the received user settings data;
generating image data with the camera;
transmitting the image data to the camera control unit;
receiving a user selection of at least a portion of the image data via at least one interface control, said at least one interface control including an input device and configured to receive commands to control one or more medical devices; and
saving the selected image data on the at least one detachable storage device.

15. The method according to claim 14,
wherein the at least one detachable storage devices includes a first detachable storage device and a second detachable storage device,
wherein the select image data is stored on the first detachable storage device, and
wherein the user settings data is transferred to the camera control unit from the second detachable storage device.

16. The method according to claim 14, wherein when the interface port is a USB port, the detachable storage device is one of a USB flash/thumb device and a USB external hard drive.

17. The method according to claim 14, further comprising the steps of coupling a display to the camera control unit, and presenting the image data to the user on the display.

18. The method according to claim 17, wherein the display comprises the at least one interface control, wherein the at least one interface control is a touch screen.

19. The method according to claim 14, wherein the image data is selected from the group consisting of video data, still frame data and combinations thereof.

20. The method according to claim 14, further comprising the step of editing the image data via the at least one interface control.

21. The method according to claim 20, wherein the editing of the image data comprises at least one of cropping the image data, zooming the image data, and highlighting the image data.

22. The method according to claim 21, wherein the editing of the image data further comprises appending information to the image data, wherein when information is appended to the image data, the appended data comprises at least one of visual data, audio data, alpha-numeric data, and linked data, and wherein the appending of data occurs concurrently with the recording of the image data.

23. A video imaging system, comprising:
an endoscopic camera for generating image data, said camera including a camera storage having camera data for identifying the camera;
a camera control unit coupled to said camera and receiving the camera data, said camera control unit adjusting internal settings based on received camera information such that the camera control unit receives and processes the image data;
at least one interface control, including an input device, receiving a user selection of at least a portion of the image data, said at least one interface control further receiving commands to control one or more medical devices;
a first interface port located in said camera control unit;
a second interface port located in said camera control unit;
a first detachable storage device coupled to said first interface port, said first detachable storage device having user settings data stored thereon that at least partially differ from default settings of said camera, wherein the user settings data comprises a software program that executes on said camera control unit, and said camera control unit is further adjusted based on the user settings data stored on said first detachable storage device; and
a second detachable storage device coupled to said second interface port, wherein said second detachable storage device receives and stores the image data selected via said at least one interface control.

24. The video imaging system according to claim 23, wherein each of said first and second interface ports is selected from the group consisting of a USB port, a Firewire port, and a serial ATA port.

25. The video imaging system according to claim 24, wherein at least one of said first and second detachable storage devices is one of a USB flash/thumb device or a USB external hard drive.

26. The video imaging system according to claim 24, wherein upon connection of said first detachable storage device, said camera control unit automatically uploads the user settings data and adjusts said camera control unit.

27. The video imaging system according to claim 24, further comprising a display coupled to said camera control unit such that the image data is presented to a user on said display.

28. The video imaging system according to claim 27, wherein said display comprises said at least one interface control, wherein at least one interface control includes a touch screen.

29. The video imaging system according to claim 27, wherein the image data presented on said display is saved to said second detachable storage device, said image data being selected from the group consisting of video data, still frame data and combinations thereof.

30. The video imaging system according to claim 29, wherein when still frame data is saved to said second detachable storage device, the resolution of the still frame data is selectable by the user via said at least one interface control from a plurality of selectable resolutions.

31. The video imaging system according to claim 29, wherein when still frame data is saved to said second detachable storage device, the still frame data is savable in a variety of formats selected from the group consisting of JPG format, BMP format, and TIFF format.

32. The video imaging system according to claim 23, wherein said at least one interface control further receives alterations of the selected image data from the user prior to saving the selected image data on said second detachable storage device.

33. The video imaging system according to claim 32, wherein the alterations comprise at least one of cropping, zooming, highlighting, and appending data.

34. The video imaging system according to claim 33, wherein the appending of data comprises at least one of visual data, audio data, alpha-numeric data, and linked data.

35. The video imaging system according to claim 23, further comprising a network connection, and wherein said second detachable storage device comprises a remote storage device coupled to said camera control unit via said network connection.

\* \* \* \* \*